United States Patent Office 3,077,379
Patented Feb. 12, 1963

3,077,379
PREPARATION OF AMMONIUM PARATUNGSTATE
Roger L. Pilloton, Niagara Falls, N.Y., assignor to Union Carbide Corporation, a corporation of New York
No Drawing. Filed Oct. 19, 1960, Ser. No. 63,458
8 Claims. (Cl. 23—51)

This invention relates to a method for producing ammonium paratungstate.

Ammonium paratungstate is a very desirable form of tungsten for many industrial applications. Much effort has been expended by industry in order to arrive at economical methods of producing this product. Tungsten is derived primarily from scheelite ore which is substantially calcium tungstate. This is normally treated by dissolution under pressure in a sodium carbonate solution. In this manner an aqueous solution of sodium tungstate is formed which may be used as a starting point for the preparation of ammonium paratungstate. It will be obvious that this sodium paratungstate solution contains not only tungsten values but also impurities such as sodium carbonate, sodium molybdate, silica, sodium fluoride, phosphorous, and molybdenum. Of these contaminants, molybdenum is one of the most difficult to control. At the present time a complex multi-step process is needed for producing ammonium paratungstate from such industrial solutions while substantially avoiding serious contamination of the product. A large number of pH changes are required which entail the use of large quantities of various acids and alkalis. Even with this complex procedure, however, impurities are almost always present in the final product.

It is therefore, the primary object of the present invention to achieve a simple one-step process for producing substantially molybdenum-free ammonium paratungstate from a molybdenum-containing aqueous solution of tungsten.

Other objects, features, and advantages will be apparent from the following description and appended claims.

The above objects are achieved by providing a molybdenum-containing aqueous solution of tungsten wherein the tungsten concentration is proportional to at least five grams tungstic oxide ($WO_3$) per liter of solution, maintaining the pH of said solution at from 7.0 to 9.0 and adding to said solution at least one material selected from the group consisting of ammonium chloride and ammonium sulphate to precipitate ammonium paratungstate substantially free of molybdenum contaminant.

The above objects are also achieved by providing a molybdenum-containing aqueous solution of tungsten wherein the tungsten concentration is proportional to at least five grams tungstic oxide ($WO_3$) per liter of solution, adjusting or correcting the pH of said solution to and maintaining the pH of said solution at from 7.0 to 9.0 and adding to said solution at least one material selected from the group consisting of ammonium chloride and ammonium sulphate to precipitate ammonium paratungstate substantially free of molybdenum contaminant.

The above objects are further achieved by providing a molybdenum-containing sodium tungstate solution wherein the tungsten concentration is proportional to at least five grams tungstic oxide ($WO_3$) per liter of solution, adding to said solution a material selected from the group consisting of ammonium chloride and ammonium sulphate and adding acid to said solution to adjust said solution to and maintain said solution at a pH of 7.0 to 9.0 to precipitate ammonium paratungstate substantially free of molybdenum contaminant. By the method of the present invention, pure ammonium paratungstate may be precipitated directly from an impure solution with little change in pH. Very small amounts of acid are therefore required.

The above objects are also further achieved by providing a molybdenum-containing tungstic acid solution wherein the tungsten concentration is proportional to at least five grams tungstic oxide ($WO_3$) per liter of solution, adding a base to said solution to adjust said solution to and maintain said solution at a pH of 7.0 to 9.0 and adding at to said solution at least one material selected from the group consisting of ammonium chloride and ammonium sulphate to precipitate ammonium paratungstate substantially free of molybdenum contaminant.

Commercial sodium tungstate digester solutions commonly have tungsten concentrations on the order of 50 grams of $WO_3$ per liter of solution. It has been discovered that the concentration of ammonium chloride per liter of treated solution has a more important effect on ammonium paratungstate precipitation than the ammonium chloride to tungsten ratio. For example, if the same amount of ammonium chloride is added to two samples containing equal amounts of equivalent $WO_3$ but in different amounts of solvent, the tungsten precipitation yield will be greater from the more concentrated solution. The effect is most pronounced at the higher ammonium chloride concentrations. For example, reference to Table III indicates that the effect of initial $WO_3$ on ammonium paratungstate precipitation yield becomes less important as $NH_4Cl$ concentrations increase until, at a concentration of 300 g./l., the percentage yields are very similar, regardless of initial tungsten concentration. For this reason, it is possible to achieve excellent recoveries with a low ammonium chloride consumption by the simple expedient of beginning with a solution characterized by a high sodium tungstate concentration. While such control of concentrations is desirable from the standpoint of efficiency and economics, it is not critical from the standpoint of work-ability of the process of the invention.

The primary critical limitation which must be carefully controlled in order to achieve a molybdenum-free precipitation product is the pH range. It has been discovered that the ammonium paratungstate yield begins to decrease rapidly as the final pH rises above 8.0. Similarly, the molybdenum contamination has been found to increase rapidly as the pH drops below 8.0. The following table indicated the manner in which tungsten precipitation and molybdenum contamination varied in accordance with the pH after the addition of 200 grams of $NH_4Cl$ per liter of solution. The pH was varied in each case by the addition of 50 percent by volume sulfuric acid solution at regular intervals.

*Table I*

| pH | Precipitation Yield, Percent | | |
|---|---|---|---|
| | Tungsten, Initial Concentration | | Mo |
| | 60 g./l. | 200 g./l. | |
| 9.0 | | 60 | 0.05 |
| 8.5 | 30 | 77 | 0.1 |
| 8.0 | 60 | 92 | 0.3 |
| 7.5 | 65 | 92 | 3.0 |
| 7.0 | 65 | 92 | 4.7 |
| 6.0 | 65 | | |

It will be apparent from the preceding table that the pH must be held above 7.0 and that a pH range of from 8.0 to 8.5 must be maintained if the molybdenum content in the precipitated product is required to be lower than 0.1 percent.

Temperature apparently has little effect either on ammonium paratungstate solubility or on tungsten precipitation yield. The only advantage of higher temperatures is that the length of time required for complete precipitation is shortened. As an example, it was necessary to stir for 96 hours at room temperature to insure that no more ammonium paratungstate would precipitate from a sample solution. Complete precipitation, however, was obtained in 24 hours at 80° C.

The overall effect of pH on the solubility of ammonium paratungstate will be apparent from the following data giving the results of tests conducted by varying the pH of sodium tungstate solution after the addition of various amounts of ammonium chloride. In each case, solubility is given in terms of gram equivalent $WO_3$ retained in the solution:

Table II

| pH | Grams $WO_3$/liter | | | | |
|---|---|---|---|---|---|
| | 50 g./l. NH₄Cl | 100 g./l. NH₄Cl | 200 g./l. NH₄Cl | 300 g./l. NH₄Cl | 400 g./l. NH₄Cl |
| 6.0 | | | | | 9.6 |
| 6.5 | 28.3 | 19.8 | | | 10.0 |
| 7.0 | 23.5 | | 19.4 | | |
| 7.5 | | | | | 10.7 |
| 8.0 | 37.3 | 27.9 | | | 12.9 |
| 8.5 | 107.5 | 73.8 | 45.5 | | |
| 9.0 | | | | 19.4 | 24.8 |
| 9.5 | | 151.0 | 103.5 | | 34.0 |

It will be apparent from the above table that solubility increases rapidly above a pH of 8, particularly at the lower concentrations of ammonium chloride.

Another series of tests was conducted substantiating the effect of ammonium chloride concentration wherein ammonium chloride was added in increments of 100, 200, and 300 grams to each of three one-liter sodium tugnstate solutions having $WO_3$ concentrations of 100, 200, and 400 grams per liter, respectively. The pH was maintained at 9 to avoid molybdenum contamination. The results tabulated below indicate that concentrations of from 200 to 300 grams of ammonium chloride per liter provide the most favorable conditions for producing the highest precipitation yield.

Table III

| NH₄Cl, g./l. | Tungsten Precipitation Yield, Percent—Initial $WO_3$ | | |
|---|---|---|---|
| | 100 g./l. | 200 g./l. | 400 g./l. |
| 50 | | | 62 |
| 100 | | 25 | 75 |
| 200 | | 48 | 82 |
| 300 | 30 | 65 | 95 |
| | 80 | 85 | |

Silica is almost as serious a contaminant as molybdenum. Accordingly, most commercial grade sodium tungstate solutions must be treated in order to remove silica and various other contaminating ingredients. If silica is present in the initial solution, it must be removed prior to the addition of ammonium chloride as it is completely precipitated along with tungsten as a result of such treatment. Silica has been successfully precipitated from the tungsten digester solution by the addition of sulphuric acid and digesting at a specific temperature for a period of time. Tests were conducted for the purpose of obtaining optimum conditions for the three variables: pH, time, and temperature. The following tables give the results of tests conducted at varying temperature (Table IV), varying pH (Table V), and varying time (Table VI):

Table IV

[Digesting at pH 9 for 4 hours]

| Temp., ° C.: | $SiO_2$ in ammonium paratungstate, percent |
|---|---|
| 30 | 0.03 |
| 50 | 0.02 |
| 70 | 0.02 |
| 90 | 0.02 |

Table V

[Digesting at 60° C. for 4 hours]

| pH: | $SiO_2$ in ammonium paratungstate, percent |
|---|---|
| 9.0 | 0.03 |
| 9.5 | 0.03 |
| 10.0 | 0.45 |
| 11.0 | >1.0 |

Table VI

[Digesting at 60° C. and pH 9]

| Time, hours: | $SiO_2$ in ammonium paratungstate, percent |
|---|---|
| 0.25 | 0.2 |
| 1 | 0.03 |
| 4 | 0.02 |
| 24 | 0.02 |

The above results show that for optimum conditions silica may be precipitated by the addition of sulphuric acid to lower the pH to approximately 9 to 9.5 at a temperature of 50° C. to 70° C. Silica precipitation was found to be substantially complete after one hour although a digestion period of four hours is necessary for best results.

Phosphorous contamination of the ammonium paratungstate may occur with certain industrial solutions. When phosphorous contamination is probable, precipitation of this element with the product may be avoided by the addition of small quantities of magnesium chloride and ammonium chloride to the alkaline sodium tungstate solution. This method of eliminating phosphorous and arsenic is a classical analytical procedure which may be performed simultaneously with the silica separation step.

As an example of the method of the invention, a one liter solution of commercial concentrated sodium tungstate solution having a pH of 10.0 was treated to remove silica, phosphorous and arsenic leaving molybdenum as the primary contaminant. The resulting solution having an equivalent tungsten concentration of 185 grams of $WO_3$ and a pH of 9.5 was utilized as a starting material. Five grams of 50 percent by volume sulphuric acid solution were added in order to adjust the pH to a value of approximately 8.5. To this solution was added 300 grams of solid ammonium chloride. A precipitate resulted which was found upon analysis to contain more than 99.0 percent ammonium paratungstate and 0.046 percent molybdenum.

Since the solubility of ammonium paratungstate increases rapidly at the high pH necessary to avoid molybdenum contamination, when very small molybdenum levels are desired, it may be desirable to leave some tungsten in solution, filter out the initial ammonium paratungstate precipitate, and recycle the filtrate. For example, if the precipitation is performed at a pH slightly above 8.5, 85 percent to 95 percent of the tungsten will be precipitated as pure ammonium paratungstate. Further precipitation of tungsten may be obtained by boiling the filtrate in an open vessel. During this evaporation step ammonia and water are removed and the pH of the filtrate drops progressively to approximately 7.0. The molybdenum content of the ammonium paratungstate that is precipitated between the pH values of 8.5 and 7.0 will rise from approximately 0.02 percent to 10 percent. This "secondary" precipitate will contain as high as 13 percent of the initial molybdenum. This material may then be recycled to a new batch of concentrated digester solution where it will raise the tungsten concentration. The filtrate resulting from this "secondary" precipitation step will contain approximately 2 percent of the initial tungsten and 92 percent of the initial molybdenum. If molybdenum is a desired byproduct, it may be obtained by any of a number of methods from this resulting filtrate.

Although the preceding description and example have been limited primarily to the use of ammonium chloride as the precipitating agent, almost equally good success will be achieved using ammonium sulphate. The amount of ammonium sulphate used must be double the amount of ammonium chloride required in order to obtain similar precipitation yields although the reason for this is not fully understood. The use of ammonium sulphate, however, may result in slight sulphur contamination.

Similarly, although sulphuric acid has been described as a useful material for pH adjustment, the invention is not so limited. Any acid or base will be equally effective. Sulphuric acid is preferred only from the standpoint of economy for use in reducing the pH.

A very important consideration in utilizing the present novel process relates to the fact that there must not be sufficient ammonium ion in the aqueous solutions of tungsten to cause precipitation of ammonium paratungstate until the pH of the solution has been properly adjusted. That is the ammonium ion must only be added in sufficient amounts to precipitate ammonium paratungstate at the instant the proper pH is reached and/or during the time the proper pH is maintained.

By following the methods of the invention it has been found possible to achieve efficient production of a molybdenum-free ammonium paratungstate from a molybdenum contaminated sodium tungstate solution. The usefulness of such a method will be immediately apparent to those skilled in the art.

This application is a continuation-in-part of U.S. application Serial No. 780,265, filed December 15, 1958, now abandoned.

What I claim is:

1. A method for obtaining substantially molybdenum free ammonium paratungstate from molybdenum-containing aqueous solutions of tungsten which comprises providing said molybdenum-containing aqueous solution of tungsten having a tungsten concentration proportional to at least 5 grams tungstic oxide per liter of said solution and having a pH of from 7.0 to 9.0, maintaining said solution at a pH of from 7.0 to 9.0 and adding to said solution at least one material selected from the group consisting of ammonium chloride and ammonium sulfate to cause precipitation of ammonium paratungstate product substantially free of molybdenum contaminant.

2. A method for obtaining substantially molybdenum free ammonium paratungstate from molybdenum-containing aqueous solutions of tungsten which comprises providing said bolybdenum-containing aqueous solution of tungsten having a tungsten concentration proportional to at least 5 grams tungstic oxide per liter of said solution, adjusting the pH of said solution to and maintaining the pH of said solution at a pH of from 7.0 to 9.0 with at least one material selected from the group consisting of inorganic acids and inorganic bases and adding to said solution at least one material selected from the group consisting of ammonium chloride and ammonium sulfate to cause precipitation of ammonium paratungstate substantially free of molybdenum contaminant.

3. A method for obtaining substantially molybdenum-free ammonium paratungstate from a molybdenum-containing sodium tungstate solution which comprises providing said sodium tungstate solution having a tungsten concentration proportional to at least 5 grams tungstic oxide per liter of said solution, adding inorganic acid to said solution to adjust the pH of said solution to and maintain the pH of said solution at a pH of 7.0 to 9.0 and adding to said solution at least one material selected from the group consisting of ammonium chloride and ammonium sulphate, to cause precipitation of ammonium paratungstate product substantially free of molybdenum contaminant.

4. A method for obtaining substantially molybdenum-free ammonium paratungstate from a molybdenum-containing sodium tungstate solution which comprises providing said sodium tungstate solution having a tungsten concentration proportional to at least 5 grams tungstic oxide per liter of said solution, adding inorganic acid to said solution to adjust the pH of said solution to and maintain the pH of said solution at a pH of 7.0 to 9.0 and adding to said solution at least one material selected from the group consisting of ammonium chloride and ammonium sulphate in an amount proportional to about 200 to about 300 grams of ammonium chloride per liter of said solution and about 400 to about 600 grams of ammonium sulphate per liter of said solution, to cause precipitation of ammonium paratungstate product substantially free of molybdenum contaminant.

5. A method for obtaining substantially molybdenum-free ammonium paratungstate from a molybdenum-containing sodium tungstate solution which comprises providing said sodium tungstate solution having a tungsten concentration proportional to at least 100 grams tungstic oxide per liter of said solution, adding inorganic acid to said solution to adjust the pH of said solution and maintain the pH of said solution at a pH of 8.0 to 8.5 and adding to said solution at least one material selected from the group consisting of ammonium chloride and ammonium sulphate in an amount proportional to about 200 to about 300 grams of ammonium chloride per liter of said solution and about 400 to about 600 grams of ammonium sulphate per liter of said solution, to cause precipitation of ammonium paratungstate product substantially free of molybdenum contaminant.

6. A method for obtaining substantially molybdenum and silica-free ammonium paratungstate from a molybdenum and silica-containing sodium tungstate solution which comprises providing said sodium tungstate solution having a tungsten concentration proportional to at least 5 grams tungstic oxide per liter of said solution, adding to said solution sulfuric acid in an amount to lower the pH of said solution to a value between about 9.0 and about 10.0, digesting said solution for at least one hour at a temperature between about 30° C. and about 90° C. to precipitate silica therefrom, correcting said solution to a pH of 7.0 to 9.0 and adding to said solution at least one material selected from the group consisting of ammonium chloride and ammonium sulphate in an amount proportional to about 200 to about 300 grams of ammonium chloride per liter of said solution and about 400 to about 600 grams of ammonium sulphate per liter of said solution to cause precipitation of ammonium paratungstate product substantially free of molybdenum and silica contaminants.

7. A method for obtaining substantially molybdenum and silica-free ammonium paratungstate from a molybdenum and silica-containing sodium tungstate solution which comprises providing said sodium tungstate solution having a tungsten concentration proportional to at least 100 grams tungstic oxide per liter of said solution, adding to said solution sulfuric acid in an amount to lower the pH of said solution to a value between about 9.0 and about 10.0, digesting said solution for at least one hour at a temperature between about 30° C. and about 90° C. to precipitate silica therefrom and correcting said solution to a pH of 8.0 to 8.5 and adding to said solution at least one material selected from the group consisting of ammonium chloride and ammonium sulphate in an amount proportional to about 200 to about 300 grams of ammonium chloride per liter of said solution and about 400 to about 600 grams of ammonium sulphate per liter of said solution to cause precipitation of ammonium paratungstate product substantially free of molybdenum and silica contaminants.

8. A method for obtaining substantially molybdenum-free ammonium paratungstate from a molybdenum-containing sodium tungstate solution which comprises providing said sodium tungstate solution having a tungsten concentration proportional to at least 100 grams tungstic oxide per liter of said solution, adding inorganic acid to said solution to adjust the pH of said solution to and maintain the pH of said solution at a pH of at least 8.5 to 9.0 and adding to said solution at least one material selected from the group consisting of ammonium chloride and ammonium sulphate in an amount proportional to about 200 to about 300 grams of ammonium chloride per liter of said solution and about 400 to about 600 grams of ammonium sulphate per liter of said solution to cause precipitation of ammonium paratungstate product substantially free of molybdenum contaminant, removing said product, evaporating ammonia and water from the remaining filtrate to lower the pH thereof to a lower value and precipitate secondary ammonium paratungstate product therefrom, recycling said secondary product to said sodium tungstate solution.

References Cited in the file of this patent

UNITED STATES PATENTS

| 2,894,814 | Loung | July 14, 1959 |
| 2,963,342 | Pilloton et al. | Dec. 6, 1960 |
| 2,963,343 | Pilloton et al. | Dec. 6, 1960 |
| 2,993,755 | Redanz | July 25, 1961 |

OTHER REFERENCES

Mellor: "Comprehensive Treatise on Inorganic and Theoretical Chemistry," Longmans, Green & Co., New York, 1931, vol. XI, pages 812 and 816.